United States Patent
Polo et al.

(10) Patent No.: US 9,946,257 B2
(45) Date of Patent: Apr. 17, 2018

(54) OUTSOURCING PROCESSING TO A SELF-PROPELLED DEVICE

(71) Applicant: Sphero, Inc., Boulder, CO (US)

(72) Inventors: Fabrizio Polo, Boulder, CO (US); Hunter James Lang, Broomfield, CO (US)

(73) Assignee: Sphero, Inc., Boulder, CO (US)

( * ) Notice: Subject to any disclaimer, the term of this patent is extended or adjusted under 35 U.S.C. 154(b) by 0 days.

(21) Appl. No.: 15/241,253

(22) Filed: Aug. 19, 2016

(65) Prior Publication Data

US 2016/0357184 A1  Dec. 8, 2016

Related U.S. Application Data

(63) Continuation of application No. 14/620,103, filed on Feb. 11, 2015, now Pat. No. 9,483,050.

(51) Int. Cl.
| | |
|---|---|
| *B62D 63/02* | (2006.01) |
| *G05D 1/00* | (2006.01) |
| *H04W 4/00* | (2009.01) |

(52) U.S. Cl.
CPC .......... *G05D 1/0022* (2013.01); *B62D 63/02* (2013.01); *G05D 1/0016* (2013.01); *H04W 4/008* (2013.01)

(58) Field of Classification Search
CPC combination set(s) only.
See application file for complete search history.

(56) References Cited

U.S. PATENT DOCUMENTS

| | | | |
|---|---|---|---|
| 5,109,566 A * | 5/1992 | Kobayashi | A47L 11/4011 15/319 |
| 5,995,884 A * | 11/1999 | Allen | G05D 1/0225 180/167 |
| 9,008,860 B2 | 4/2015 | Waldock | |

* cited by examiner

*Primary Examiner* — Yonel Beaulieu
(74) *Attorney, Agent, or Firm* — Merchant & Gould P.C.

(57) ABSTRACT

A self-propelled device can establish a communication link with a controller device that is operable by a user to remotely control the self-propelled device. The self-propelled device can further receive, over the communication link, a computer code package from the controller device, and execute the computer code package to perform one or more processing operations performed by the controller device.

20 Claims, 7 Drawing Sheets

OUTSOURCING PROCESSING TO A SELF-PROPELLED DEVICE

RELATED APPLICATIONS

This application is a continuation of U.S. patent application Ser. No. 14/620,103, issued as U.S. Pat. No. 9,483,050 on Nov. 1, 2016, entitled "OUTSOURCING PROCESSING TO A SELF-PROPELLED DEVICE," filed on Feb. 15, 2015, which application is hereby incorporated by reference in its entirety.

BACKGROUND

Remote controlled devices have previously been operated using specialized remote controllers specific to a particular device. With the onset of network technology, mobile application development, and multi-functional mobile devices, the field of operating and controlling such remote controlled devices is broadening. Furthermore, self-propelled devices can include internal processing resources to perform any number of operations.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Systems and methods are provided for outsourcing processing operations between a mobile computing device and a self-propelled device under control of the mobile computing device. During operation, a connection is established between the mobile computing device and the self-propelled device in order to transmit control commands to be implemented on a drive system of the self-propelled device. Additional data may be transmitted between the devices, such as sensor data from an inertial measurement unit of the self-propelled device. These transmissions can cause latency in the connection that can disrupt the control commands and interrupt the dynamically smooth control of the self-propelled device. For example, data traffic between the self-propelled device and the mobile computing device may cause the mobile computing device or the self-propelled device to begin buffering transmissions or otherwise delay control transmissions.

The mobile computing device can outsource certain operations to the self-propelled device automatically due to an anticipated latency in the connection. For example, the mobile computing device can establish a BLUETOOTH low energy connection with a self-propelled device which requires processing of sensor data from the self-propelled device. Instead of receiving a periodic or continuous stream of sensor data from the self-propelled device, the sensor data processing may be outsourced to the processing resources of the self-propelled device. In such implementations, a periodic message can be compiled by the self-propelled device and transmitted to the mobile computing device, resulting in significant reduction in bandwidth usage. Additionally or alternatively, the mobile computing device may be enabled to detect when latency occurs in the connection and determine a number of operations that may be outsourced to the self-propelled device. For example, a near-continuous stream of sensor data from the self-propelled device may take up valuable bandwidth which could otherwise be utilized for sending dynamic control commands to the self-propelled device. However, the sensor data may be necessary to make computations involving the state of the self-propelled device, or to determine maneuvers and/or tricks performed by the self-propelled device. Thus, the mobile computing device may compile a code package to be executed by the self-propelled device to outsource one or more operations performed by the mobile computing device—such as calculations or look-ups involving maneuvers performed by the self-propelled device.

The self-propelled device may receive and decompress the code package to execute the code compiled by the mobile computing device. Execution of the code may cause the self-propelled device to perform a number of operations otherwise performed by the mobile computing device, such as utilizing the sensor data, from an inertial measurement unit of the self-propelled device, in order to calculate or otherwise determine maneuvers performed by the self-propelled device while under control. Such maneuvers may be logged in a local memory or compiled into a message to be transmitted back to the mobile computing device. Such maneuvers may be predefined according to a gaming application in which select maneuvers earn particular user credits or points based on the game.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein can be implemented, in whole or in part, on computing devices such as digital cameras, digital camcorders, desktop computers, cellular or smart phones, personal digital assistants (PDAs), laptop computers, printers, digital picture frames, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a non-transitory computer usable carrier medium capable of carrying such a program.

System and Device Description

Figure 1:
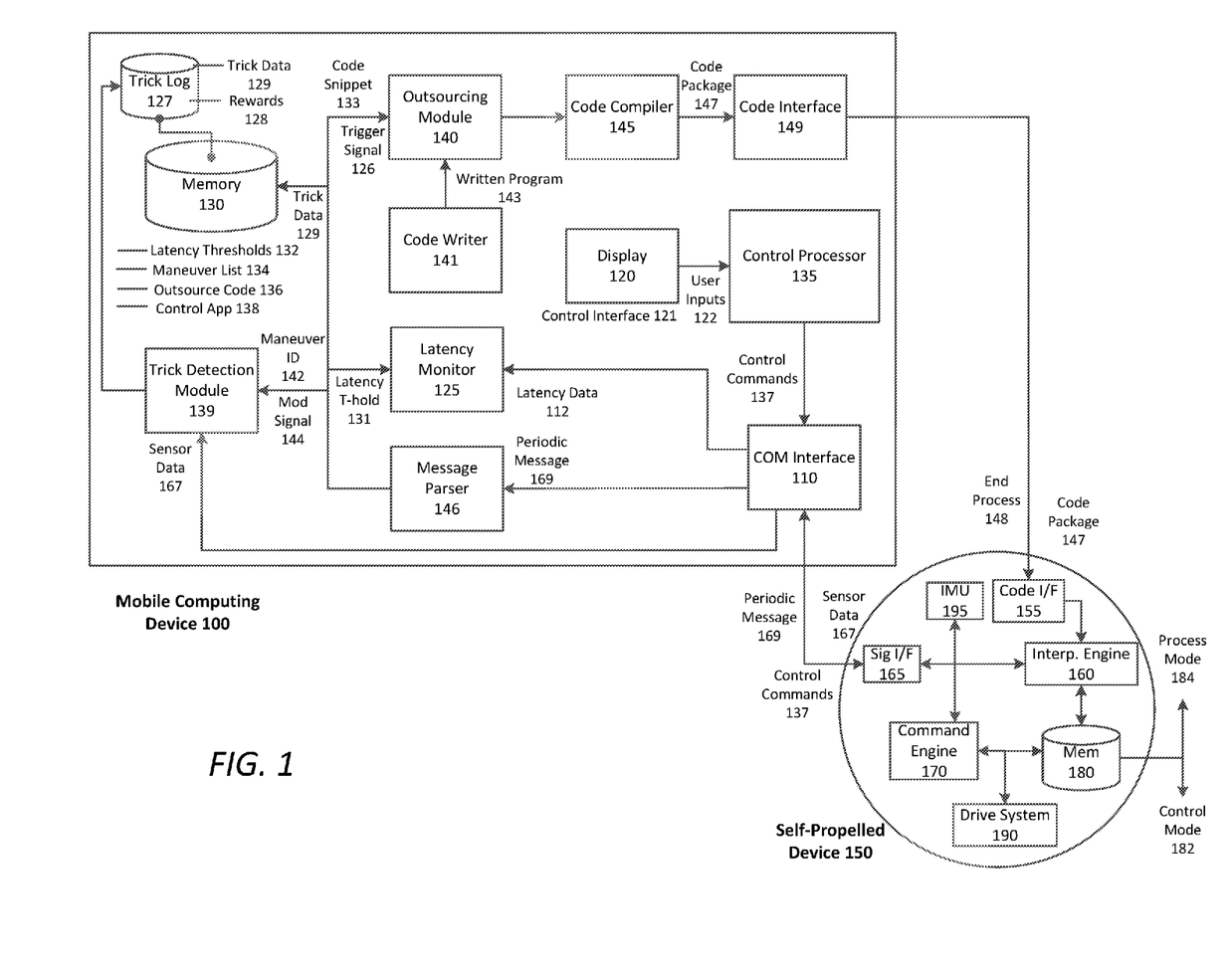
FIG. 1 is a block diagram illustrating an example mobile computing device outsourcing programmatic operations to a self-propelled device.

FIG. 1 is a block diagram illustrating an example mobile computing device outsourcing programmatic operations to a self-propelled device. The mobile computing device 100 can initiate a connection to operate the self-propelled device 150. In accordance with many examples, a user of the mobile computing device 100 can launch a control application 138, specific to controlling the self-propelled device 150, by interacting with a display 120 of the mobile computing device 100. Upon establishing a control connection (e.g., by launching the control application 138), a control interface 121 may be generated by the mobile computing device 100 and displayed to the user. The control interface 121 can include virtual controls to enable the user to operate the self-propelled device 150.

User inputs 122 on the control interface 121 can be processed by a control processor 135 of the mobile computing device 100. The control processor 135 can receive the user inputs 122 for translation into control commands 137 for direct implementation on a drive system 190 of the self-propelled device 150. Such translated control commands 137 can be transmitted to a communication interface 110 of the mobile computing device 100 for transmission to the self-propelled device 150 over the established connection.

The control commands 137 can be received by the self-propelled device 150 via a signal interface 165, which can transmit the control commands 137 to a command engine 170 included with the self-propelled device 150. The command engine 170 can then implement the control commands 137 on the drive system 190 of the self-propelled device 150 in order to cause the self-propelled device 150 to be maneuvered in accordance with the user inputs 122 on the control interface 121.

In variations, the user inputs 122 may be transmitted directly to the self-propelled device 150 for processing. In such implementations, the self-propelled device 150 can include processing logic implemented by the control processor 135, and perform translation of the user inputs 122 into control commands 137 to be implemented on the drive system 190.

In various examples, the established connection between the mobile computing device 100 and the self-propelled device 150 can be established in accordance with one or more of a variety of wireless network technologies, including BLUETOOTH low energy, Classic BLUETOOTH, Wireless USB, and various Wi-Fi or other wireless standards. In many implementations, the established connection between the mobile computing device 100 and the self-propelled device 150 may have limited bandwidth (e.g., BLUETOOTH low energy). Accordingly, transmission delays or data buffering may result from additional data transmissions over the connection. For example, the self-propelled device 150 can include a number of sensors to provide feedback to the mobile computing device 100. Such sensors can include, for example, a three-axis gyroscope, accelerometer(s), magnetometer(s), temperature sensor(s), ambient light detectors, and the like. Sensor data 167 from such sensors may be transmitted back to the mobile computing device 100 in either a streaming fashion or intermittently. For dynamic operation of the self-propelled device 150, this sensor data 167 may consume valuable bandwidth that could otherwise be used for transmitting control commands 137 or other data.

In some aspects, the connection may be established for purposes of not only operating the self-propelled device 150, but also utilizing the sensor data 167 to identify or determine a number of actions performed by the self-propelled device 150. For example, the sensor data 167 can include state information describing the state of one or more components (e.g., the remaining battery power) of the self-propelled device 150. Additionally or alternatively, an inertial measurement unit 195 that includes a number of the sensors can be utilized to stream or intermittently transmit sensor data 167 to the mobile computing device 150 while under operation.

In some implementations, a user may operate the self-propelled device 150 under task oriented conditions, such as in a gaming or research/experimental environment. In such implementations, the mobile computing device 100 may require feedback updates (e.g., sensor data 167) from the self-propelled device 150 regarding, for example, maneuvers performed or state information. Furthermore, the mobile computing device 100 may utilize the sensor data 167 in order to perform calculations to determine which maneuvers the self-propelled device 150 has performed.

In some examples, the mobile computing device 100 can include a trick detection module 139 that can receive the sensor data 167 and perform calculations to determine maneuvers performed by the self-propelled device 150. For example, the trick detection module 139 may be programmed to receive sensor data 167 from the inertial measurement unit 195 and determine specific maneuvers performed by the self-propelled device 150 based on the sensor data 167. A memory 130 of the mobile computing device 100 can include a maneuver list 134 (e.g., a look-up table) in which the trick detection module 139 can make comparisons to determine a specified maneuver based on the raw sensor data 167. As such, the trick detection module 139 can pull a maneuver identifier 142, corresponding to received sensor data 167, from the memory 130 and log the performed maneuver as trick data 129 in a trick log 127.

According to one or more examples, the trick detection module 139 can reset the trick log 127 based on each launch of the control application 138. In such examples, trick data 129 is accumulated only for each control session initiated by the user. Additionally or as an alternative, the trick detection module 139 can initiate a timer and reset the trick log 127 after a predetermined amount of time during a control session. Further still, the trick detection module 139 can continuously accumulate trick data 129 through control sessions, such that the trick log 127 can contain all maneuvers or tricks performed by the user operating the self-propelled device 150.

In some examples, the trick detection module 139 may also issue rewards 128 to the user for performing certain tricks/maneuvers. Such rewards 128 may be financial rewards, user credits, gaming points, online currency, application-based currency, and the like. For example, in gaming implementations, a number of points may be issued to the user for causing the self-propelled device 150 to perform any number of predefined maneuvers. These points (i.e., rewards 128) may be accumulated in the trick log 127. Additionally, the trick log 127 can store historical trick data 129 and rewards 128 based on the user's previous sessions.

Additionally or as an alternative, the trick detection module 139 can make various other determinations based on the sensor data 167, and utilize such data 167 to cause one or more components of the self-propelled device 100 to implement a response. As an example, the trick detection module 139 can receive sensor data 167 indicating that the self-propelled device 150 has entered a processing mode 184, in which the trick detection module's 139 operations are to be performed by the self-propelled device 150. In such examples, the trick detection module 139 can disable processing of sensor data 167 and be placed on standby for receipt of incoming communications (e.g., a periodic message 169 from the self-propelled device 150).

Transmitting the sensor data 167 to the mobile computing device 100 may take up valuable bandwidth that may cause disruption in the dynamic operation of the self-propelled device 150. For example, in BLUETOOTH low energy implementations, transmission of the sensor data 167 may cause the mobile computing device 100 to delay transmission of control commands 137, which may result in control interruptions for the self-propelled device 150.

To address such issues, the mobile computing device 100 can outsource certain operations to the self-propelled device 150 automatically due to this anticipated latency in the connection. For example, the mobile computing device 100 can establish a BLUETOOTH low energy connection with a self-propelled device 150 which requires processing of sensor data 167 from the self-propelled device 150. Instead of receiving a periodic or continuous stream of sensor data 167 from the self-propelled device 150, the sensor data processing may be outsourced to the processing resources of the self-propelled device 150. In such implementations, a periodic message 169 can be compiled by the self-propelled device 150 and transmitted to the mobile computing device 100, resulting in significant reduction in bandwidth usage.

Additionally or alternatively, the mobile computing device 100 may be enabled to detect when latency occurs in the connection and determine a number of operations that may be outsourced to the self-propelled device 150. For example, a near-continuous stream of sensor data 167 from the self-propelled device 150 may take up valuable bandwidth which could otherwise be utilized for sending dynamic control commands 137 to the self-propelled device 150. However, the sensor data 167 may be necessary to make computations involving the state of the self-propelled device 150, or to determine maneuvers and/or tricks performed by the self-propelled device 150. Thus, the mobile computing device 100 may compile a code package 147 to be executed by the self-propelled device 150 to outsource one or more operations performed by the mobile computing device 100—such as calculations or look-ups involving maneuvers performed by the self-propelled device 150.

In accordance with many examples, the mobile computing device 100 can include a latency monitor 125 to analyze the connection in order to determine whether latency exists. The latency monitor 125 can monitor the communication interface 110 and/or receive input from the control processor 135 in order to identify when control commands 137 are being delayed. This latency data 112 can be detected by the latency monitor 125, which can cause the mobile computing device 100 to instigate code packaging to outsource processing operations.

Alternatively, the memory 130 of the mobile computing device 100 can store various latency thresholds 132, which may each be based on the connection established with the self-propelled device 150 (e.g., Classic BLUETOOTH, BLUETOOTH low energy, etc.). The latency monitor 125 may take into account these latency thresholds 132 in order to determine whether the latency data 112 exceeds the respective latency threshold 131. When the latency in the connection crosses the latency threshold 131, the latency monitor 125 can transmit a trigger signal 126 to an outsourcing module 140, which can then begin the process of outsourcing operations away from the mobile computing device 100.

Upon receiving the trigger signal 126, the outsourcing module 140 can identify the latency in the connection and determine one or more operations, performed by the mobile computing device 100, that can be outsourced to the self-propelled device 150. Thus, the outsourcing module 140 can essentially identify the data that is being transmitted between the mobile computing device 100 and the self-propelled device 150 and determine whether some of that data is necessary for transmission or whether some the data can be utilized by either the mobile computing device 100 or self-propelled device 150 in order to minimize bandwidth usage.

For variations in which the user inputs 122 are transmitted directly to the self-propelled device 150 for processing, the outsourcing module 140 may determine that such transmissions of raw user inputs 122 consumes too much bandwidth, and therefore cause the control processor 135 to translate the user inputs 122 into compressed control commands 137 for transmission to the self-propelled device 150, thereby reducing bandwidth consumption.

According to many examples, sensor data 167, transmitted from the self-propelled device 150 to the mobile computing device 100 for processing by the trick detection module 139, consumes a considerable amount of bandwidth. Thus, the outsourcing module 140 can determine that at least some of the operations performed by the trick detection module 139 can be outsourced to the self-propelled device 150. For example, the outsourcing module 140 can determine that any fraction (e.g., ½) of the trick calculations performed by the trick detection module 139 can be performed by the self-propelled device 150 in order to free up enough bandwidth to substantially eliminate latency.

Accordingly, the outsourcing module 140 can determine that say, one-third of the trick detection calculations being outsourced to the self-propelled device 150 will eliminate latency, then the outsourcing module 140 can (i) transmit a modification signal 144 to the trick detection module 139 to modify operations accordingly, and (ii) package code to be transmitted to the self-propelled device 150 for execution to begin performing the operations otherwise performed by the trick detection module 139, as discussed below.

Additionally or alternatively, in response to receiving the trigger signal 126 from the latency monitor 125, the outsourcing module 140 can pull outsource code 136 from the memory 130 and submit it to a code compiler 145, which can compile the outsource code 136 into a code package 147. The outsourcing module 140 may determine that based on elements of the task-oriented operations corresponding to user control of the self-propelled device 150 (e.g., a particular aspect of gameplay or a particular experimental application), custom code may be necessary for the self-propelled device 150 to perform desired operations. Accordingly, the outsourcing module 140 can direct this custom code to be written by a code writer 141 of the mobile computing device 100, or an external server over a network. For example, the user may be operating the self-propelled device 150 in accordance with gaming rules in which completion of certain tasks results in associated achievements (e.g., performing maneuvers and receiving points, completing a gaming level and instigating download of a successive level, etc.). Based on the gaming rules, the outsourcing module 140 can cause the code writer 141 to write a program 143 for execution on the self-propelled device 150. The outsourcing module 140 can further pull code snippets 133 or other aspects from the outsource code 136 stored in the memory 130.

The written program 143 and/or the code snippets 133 can then be transferred to the code compiler 145 for compiling into a code package 147. Such compiling may consist of transforming the source code (e.g., the written program 143 and the code snippets 133) into the target language of the self-propelled device 150. Additionally or alternatively, the code compiler 145 may compress the code package 147 and submit the compressed code package 147 to the self-propelled device 150 via a code interface 149.

The code package 147 can be received by via a code interface 155 of the self-propelled device 150. The code package 147 can be decompressed and executed by an interpretation engine 160 of the self-propelled device 150. Upon execution, the self-propelled device 150 can begin implementing operations otherwise performed by the mobile computing device 100. For example, execution of the code package 147 can cause the interpretation engine 160 to begin receiving the sensor data 167 from the inertial measurement unit 195 of the self-propelled device 150, and cause a cease in transmission of such sensor data 167 to the mobile computing device 100—thereby freeing up bandwidth for control commands 137 and other data transmissions.

During typical operating conditions, the self-propelled device 150 operates in control mode 182, where it passively receives control commands 137 from the mobile computing device 100 and the command engine 170 implements the control commands 137 on the drive system 190. In variations, the command engine 170 itself can receive the raw user inputs 122 and perform the translation into control commands 137 to be implemented on the drive system 190. When latency is detected and the code package 147 is received by the self-propelled device 150, the interpretation engine 160 can initiate a processing mode 184 on the self-propelled device 150.

Initiation of the processing mode 184 can cause the inertial measurement unit 195 to stream or intermittently transmit the sensor data 167 to the interpretation engine 160 for processing. According to many examples, the self-propelled device 150 can include a local memory 180 that can also store a maneuver list (e.g., maneuver list 134). The interpretation engine 160 can utilize the sensor data 167 from the inertial measurement unit 195 in the same or similar manner as the trick detection module 139 of the mobile computing device 100. Accordingly, the interpretation engine 160 can identify maneuvers/tricks performed by the self-propelled device 150 based on the sensor data 167. The interpretation engine 160 may maintain trick data 129 in a local trick log and/or compile the trick data 129 into a periodic message 169 to be transmitted to the mobile computing device 100. In such examples, the substitution of transmitting the periodic message 169, which includes the trick data 129, in place of the sensor data 167, results in significant reductions in bandwidth consumption. Thus, latency may be reduced or eliminated, allowing for smooth and dynamic control of the self-propelled device 150.

In variations, the interpretation engine 160 can include additional information in the periodic message 169, such as state information of the self-propelled device 150. Such state information may include, but is not limited to, battery power level, processing capacity, memory available, device status information (e.g., faulty or malfunctioning components), and the like.

The periodic message 169 can be received through the communication interface 110 of the mobile computing device 100, which may transmit the periodic message 169 to a message parser 146 of the mobile computing device 100. Accordingly, the periodic message 169 can be parsed by the message parser 146 to identify maneuver information, such as trick data 129, and other included data, such as state information of the self-propelled device 150. The message parser 146 can transmit the trick data 129 to the trick log 127, which may be monitored by the trick detection module 139. The trick detection module 139 can issue rewards 128 accordingly, as described above. Furthermore, parsed state information may be transmitted to any respective components of the mobile computing device 100 for informational purposes or to elicit a response.

According to examples, the periodic message 169 may include information indicating that the self-propelled device 150 is low on power, and thus an indication may be displayed on the display 120 reflecting the low power state of the self-propelled device 150. Additionally or alternatively, the parsed state information can include an indication that the processing capabilities of the self-propelled device 150 are being stressed by the processing mode 184. Thus, the outsourcing module 140 may cause an alternative code package to be compiled that alleviates some of the processing performed by the interpretation engine 160 of the self-propelled device 150. Alternatively, the outsourcing module 140 can cause an end process signal 148 to be sent to the self-propelled device 150 in order to deactivate the processing mode 184, and initiate normal control mode 182, or place the self-propelled device 150 into a sleep state.

In alternative implementations, latency can be detected by the self-propelled device 150, which can include a number of the components depicted in the mobile computing device 100 of FIG. 1, such as the latency monitor 125. Upon the connection crossing a relative latency threshold 131, the self-propelled device 150 can automatically initiate the processing mode 184, thereby preventing sensor data 167 from being transmitted to the mobile computing device 100 outright. Thus, without any action on the part of the mobile computing device 100, the self-propelled device 150 can itself reduce or eliminate latency in the connection.

Figure 2A:
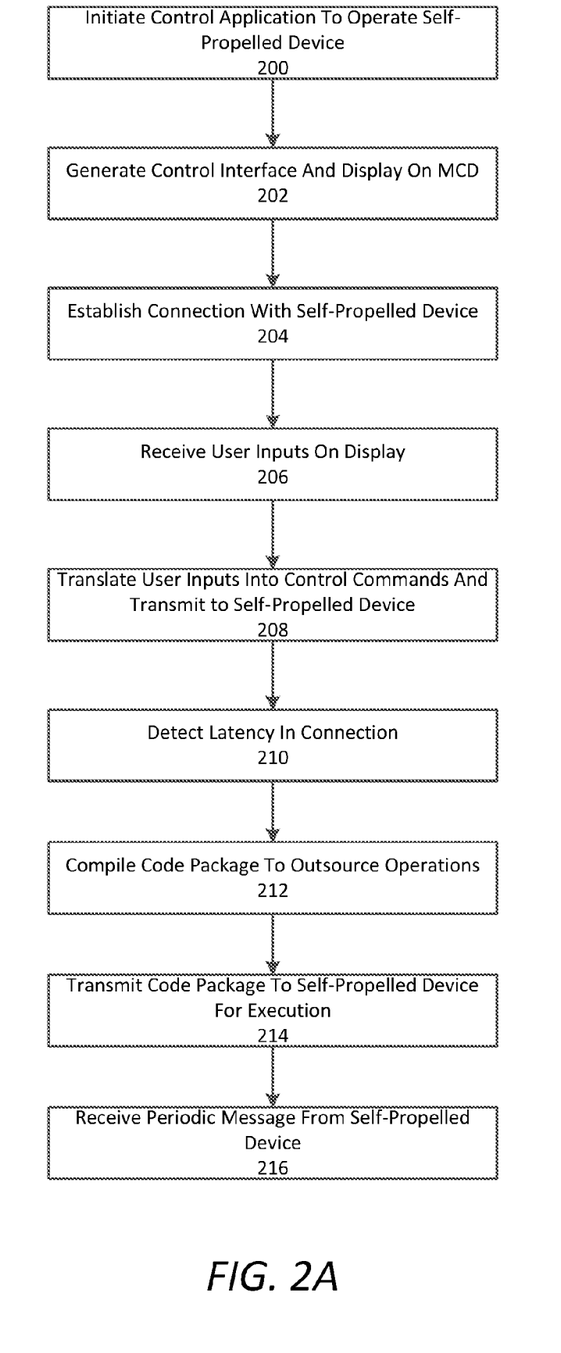
FIG. 2A is a high level flow chart describing an example method of outsourcing programmatic operations to a self-propelled device.

FIG. 2A is a high level flow chart describing an example method of outsourcing programmatic operations to a self-propelled device. In the below discussion of FIG. 2A, reference may be made to like reference characters representing various features of FIG. 1 for illustrative purposes. Furthermore, the method described in connection with FIG. 2A may be performed by the mobile computing device 100 as illustrated in FIG. 1. Referring to FIG. 2A, the mobile computing device 100 can initiate a control application 138 to operate the self-propelled device 150 (200). The control application 138 may be specific to operating the self-propelled device 150, and can cause the mobile computing device 100 to generate a user interface (e.g., control interface 121) for display on the mobile computing device 100 (202). The user interface may include virtual controls to enable a user to operate the self-propelled device 150 through touch interactions with the virtual controls.

The user interface can also include various features corresponding to task-oriented operational control of the self-propelled device 150. For example, the user interface can include features instructing the user to perform a number of tasks that result in a corresponding response (e.g., gaming, research, or experimental tasks). Additionally or alternatively, the user interface may be generated in accordance with a gaming application that includes control of the self-propelled device 150. Such a gaming application can include, in addition to the virtual controls, various features comprising a virtual environment or augmented reality. Furthermore, the self-propelled device 150 may be continuously detected or sensed by the mobile computing device 100, and a representation of the self-propelled device 150 may be generated in the virtual world or augmented reality environment. Furthermore, launch of the control application 138 can cause the mobile computing device 100 to establish a connection with the self-propelled device 150 (204). As discussed above, the connection can be established in accordance with one or more of a variety of wireless network technologies, including BLUETOOTH low energy, Classic BLUETOOTH, Wireless USB, and various Wi-Fi or other wireless standards.

The mobile computing device 100 may receive user inputs 122 on the display 120 (206). Accordingly, the mobile computing device 100 can include a control processor 135 to translate the user inputs 122 into control commands 137 to be transmitted to the self-propelled device 150 (208). In variations, raw data corresponding to the user inputs 122 may be transmitted directly to the self-propelled device 150 for translation into control commands 137 to be implemented on the drive system 190 of the self-propelled device 150. In many implementations, the established connection between the mobile computing device 100 and the self-propelled device 150 may have limited bandwidth (e.g., BLUETOOTH low energy). Accordingly, transmission delays or data buffering (latency) may result from additional data transmissions over the connection.

The mobile computing device 100 can detect the latency in the connection (210). In response to detecting the latency, the mobile computing device 100 can compile a code package 147 comprised of prewritten outsource code (e.g., code snippets) and/or custom written code (212). The mobile computing device may then transmit the code package 147 to the self-propelled device 150 for execution (214).

Execution of the code package 147 by the self-propelled device 150 can cause the self-propelled device 150 to perform certain operations otherwise performed by the mobile computing device 100. As discussed above, such operations may be to cease transmission of sensor data 167 to the mobile computing device 100, and instead process the sensor data 167 internally. Accordingly, the self-propelled device 150 can process the sensor data 167 and compile the results in a periodic message 169 to be transmitted to the mobile computing device 100. For example, the self-propelled device 150 can determine, from the sensor data 167, maneuvers or tricks performed by the self-propelled device 150. Additionally or alternatively, the self-propelled device 150 can utilize the sensor data 167 to determine the state of one or more components of the self-propelled device 150 and compile such state information into the periodic message 169. In accordance with many examples, the mobile computing device 100 can receive such periodic messages 169 from the self-propelled device 150 (216), and process such messages 169 accordingly.

Figure 2B:
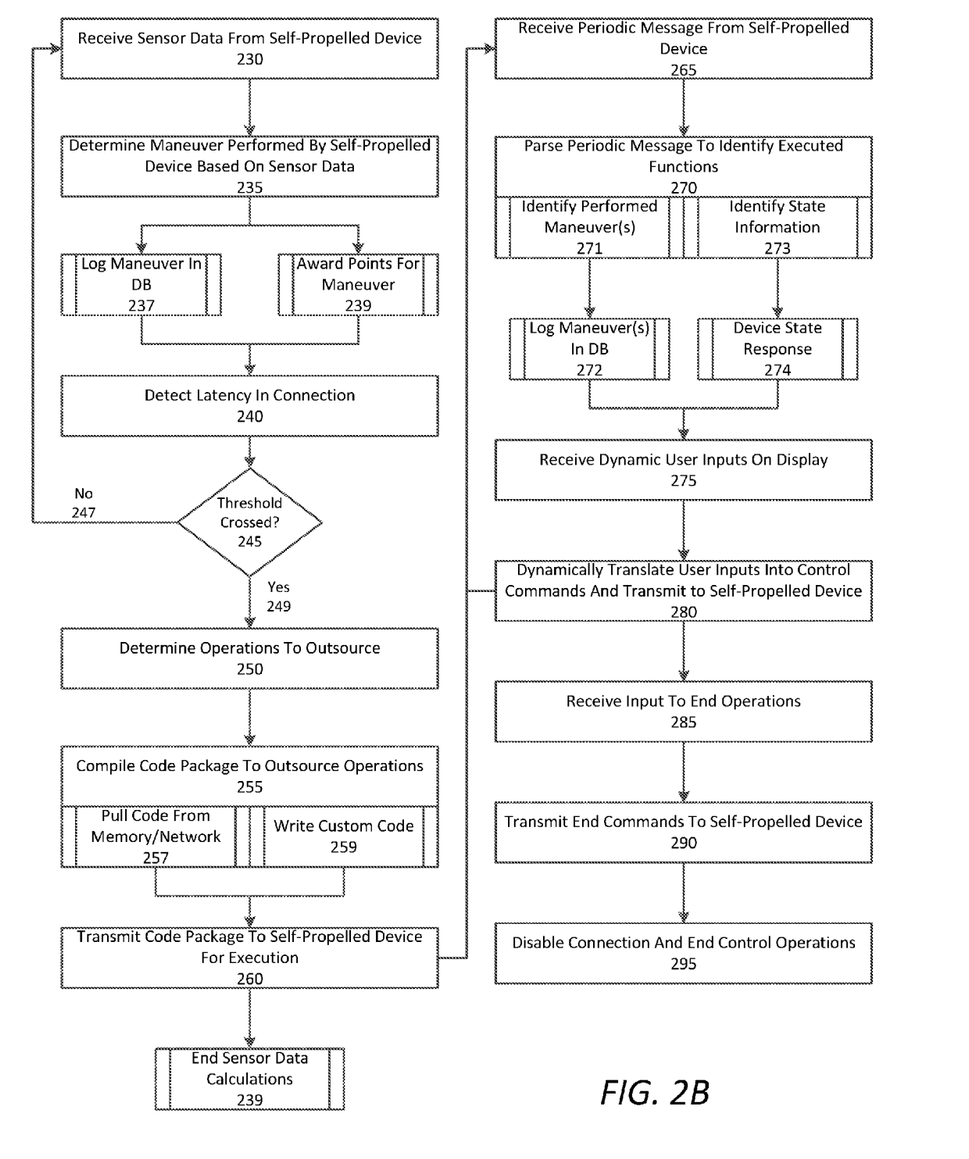
FIG. 2B is a low level flow chart describing an example method of outsourcing programmatic operations to a self-propelled device.

FIG. 2B is a low level flow chart describing an example method of outsourcing programmatic operations to a self-propelled device. In the below discussion of FIG. 2B, reference may be made to like reference characters representing various features of FIG. 1 for illustrative purposes. Furthermore, the low level method described in connection with FIG. 2B may also be performed by the mobile computing device 100 as illustrated in FIG. 1. In normal operating conditions, the mobile computing device 100 can operate the self-propelled device 150 in a control mode 182, in which control commands 137 are transmitted to the self-propelled device 150 via a connection (e.g., BLUETOOTH low energy) for implementation on the drive system 190 in order to maneuver the self-propelled device 150 based on user inputs 122 on the display 120 of the mobile computing device 100. Furthermore, referring to FIG. 2B, sensor data 167 may be received continuously or intermittently from the self-propelled device 150 (230).

According to many examples, the mobile computing device 100 can process the sensor data 167 to determine one or more maneuvers performed by the self-propelled device 150 (235). The mobile computing device 100 can then log such maneuver information in a database (e.g., trick log 127) (237). Furthermore, in gaming implementations, the mobile computing device 100 can award points depending on the maneuvers performed (239).

In many examples described herein, the mobile computing device 100 can detect latency in the connection (240), which may affect smooth operation of the self-propelled device 150. The mobile computing device 100 may compare the latency with latency tolerability thresholds to determine whether the latency causes undesirable interruptions in the dynamic operation of the self-propelled device 150 (245). For example, the transmission of the sensor data 167 may cause delay in the transmission of some control commands 137, which can disrupt smooth operation of the self-propelled device 150. Alternatively, the mobile computing device 100 may automatically compile the code package 147 upon any detection of latency in the connection. Compilation of the code package(s) 147 and latency detection may be performed dynamically by the mobile computing device.

If a latency threshold is not crossed (247), then the mobile computing device 100 may continue to control the self-propelled device 150 in control mode 182, in which sensor data 167 are received and processed, and control commands 137 are transmitted to the self-propelled device 150. However, if the latency threshold is crossed (249), the mobile computing device can determine which operations can be outsourced to the self-propelled device 150 in order to free up bandwidth in the connection (250). In some implementations—in which raw user input data is transmitted to the self-propelled device 150 for translation—the mobile computing device 100 can determine that such translations may be performed internally. Thus, the mobile computing device 100 can perform the translation of the user inputs 122 into control commands 137, which can reduce bandwidth consumption. In equivalent or similar implementations—in which translations are initially performed by the mobile computing device 100—the mobile computing device 100 can determine that transmission of the sensor data 167 is causing disruption in control command 167 transmission. Thus, the mobile computing device 100 can determine that such sensor data 167 can be processed internally by the self-propelled device 150 in order to reduce or eliminate latency.

Accordingly, the mobile computing device 100 can compile a code package 147 (255) for execution by the self-propelled device 150 to cause the self-propelled device 150 to process the sensor data 167 and compile periodic messages 169 for transmission back to the mobile computing device 100. In compiling the code package 147, the mobile computing device 100 may pull outsourcing code from a memory resource of the mobile computing device 100 or from an external server over a network connection (257). Additionally or as an alternative, the mobile computing device 100 can cause customized code to be written (259), internally or by a network server, such that execution of the code package 147 causes the self-propelled device 150 to perform desired operations. After compiling the code package 147, the mobile computing device 100 can transmit the code package to the self-propelled device 150 for execution (260). Furthermore, upon detecting that sensor data 147 is no longer being transmitted, the mobile computing device 100 can end sensor data calculations (239).

After transmitting the code package 147 to the self-propelled device 150, the mobile computing device 100 can receive a message 169 periodically from the self-propelled device 150 (265). Upon receiving the message 169, the mobile computing device 100 can parse the message 169 to identify the executed functions of the self-propelled device 150 (270). For example, the message 169 may contain information regarding one or more maneuvers performed by the self-propelled device 150 (271). Additionally, the message 169 may contain information regarding the state of the self-propelled device 150 (273). Such identified information may be utilized by the mobile computing device 100 for informational purposes or to cause an action to be performed by one or more components of the mobile computing device 100. As an example, performed maneuvers can be logged in a database (e.g., trick log 127) (272) and/or rewards may be issued based on such maneuvers. Furthermore, the mobile computing device 100 can respond to the device state information (274), such as ending processes when the self-propelled device 150 is in a low power state.

In continued operation, where the self-propelled device 150 operates in processing mode 184, the mobile computing device 100 can continue to receive user inputs 122 on the display 120 (275). In terms of user experience, the transition by the self-propelled device 150 from control mode 182 to processing mode 184 may be dynamic and seamless. Accordingly, the user may have no knowledge or indication that the processing of sensor data 167 has been outsourced to the self-propelled device 150, and therefore continues to operate the self-propelled device 150 in, for example, a gaming manner. The user inputs 122 can be dynamically translated by the mobile computing device 100 into control commands 137, which can be transmitted to the self-propelled device 150 (280) for implementation on the drive system 190.

Based on the transmitted control commands 137 the self-propelled device 150 can perform maneuvers and tasks which may be identifiable based on sensor data 167 from, for example, the inertial measurement unit 195. As described above, in processing mode 184, the self-propelled device 150 can process such sensor data 167 and compile a message 169 for transmission to the mobile computing device 100. Thus, the mobile computing device 100 can periodically receive such messages 169, based on the transmitted control commands 137 (265), which can contain processed information, such as maneuver data and state information.

In some variations, when the user wishes to end a control session, the user may interact with the mobile computing device 100 accordingly. Alternatively, the control session may be ended automatically in response to an event, such as a low battery event on the self-propelled device 150, or the end of a certain element of gameplay. As such, the mobile computing device 100 can receive an input to end the session (285). In response to a user input or respective event, the mobile computing device 100 can transmit end commands to the self-propelled device 150 to cause the self-propelled device 150 to power down components and enter a sleep mode (290). Optionally, the end commands may include instructions to delete the executed code package 147 transmitted to the self-propelled device 150. After transmitting such end commands, the mobile computing device 100 can disable the connection and close the control application 138 (295).

Example Self-Propelled Device

Figure 3A:
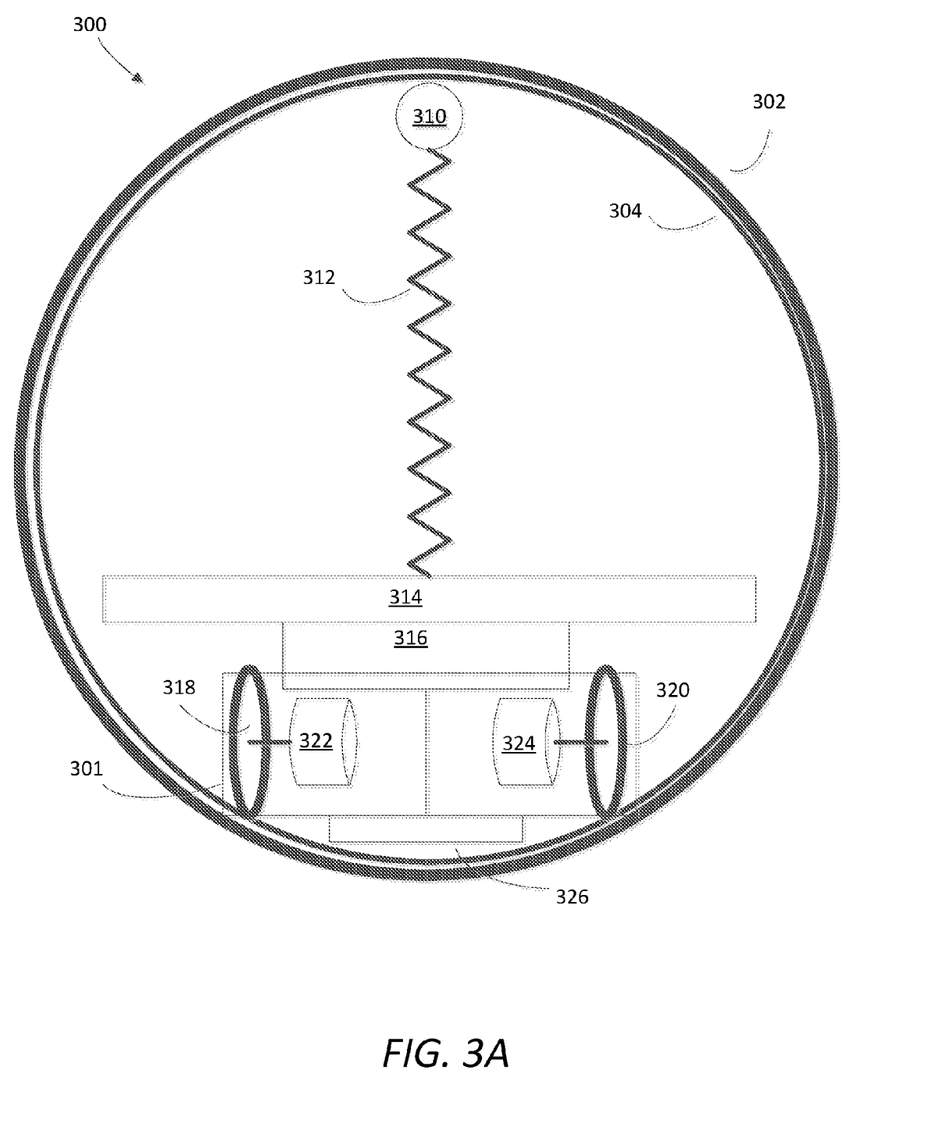
FIG. 3A is schematic diagram illustrating components of an example self-propelled device.

FIG. 3A illustrates schematic diagram of an example self-propelled device 300 upon which examples described herein may be implemented. However, variations of the present disclosure are not limited to such devices. Rather, the systems and methods described herein can be implemented with respect to any remote device in which pairings or connections are made. Referring to FIG. 3A, the self-propelled device 300 can be of a size and weight allowing it to be easily grasped, lifted, and carried in an adult human hand. The self-propelled device 300 can include an outer spherical shell (or housing) 302 that makes contact with an external surface as the device maneuvers. In addition, the self-propelled device 300 can include an inner surface 304 of the outer shell 302. Additionally, the self-propelled device 300 can include several mechanical and electronic components enclosed by outer shell 302 and inner surface 304 (collectively known as the envelope).

The outer shell 302 and inner surface 304 can be composed of a material that transmits signals used for wireless communication, and yet are impervious to moisture and dirt. The envelope material can be durable, washable, and/or shatter resistant. The envelope may also be structured to enable transmission of light and is textured to diffuse the light.

In one variation, the housing is made of sealed polycarbonate plastic. In one example, at least one of the outer shell 302 or inner surface 304 are textured to diffuse light. In one example, the envelope comprises two hemispherical shells with an associated attachment mechanism, such that the envelope can be opened to allow access to the internal electronic and mechanical components.

Several electronic and mechanical components are located inside the envelope for enabling processing, wireless communication, propulsion and other functions (collectively referred to as the "interior mechanism"). Among the components, examples include a drive system 301 to enable the device to propel itself. The drive system 301 can be coupled to processing resources and other control mechanisms, as described with other examples. The carrier 314 serves as the attachment point and support for components of the interior mechanism. The components of the interior mechanism are not rigidly attached to the envelope. Instead, the interior mechanism can be in frictional contact with the inner surface 304 at selected points, and is movable within the envelope by the action of actuators of the drive mechanism.

The carrier 314 can be in mechanical and electrical contact with an energy storage 316. The energy storage 316 provides a reservoir of energy to power the device 300 and electronics and can be replenished through N inductive charge port 326. The energy storage 316, in one example, is a rechargeable battery. In one variation, the battery is composed of lithium-polymer cells. In other variations, other rechargeable battery chemistries are used.

The carrier 314 can provide the mounting location for most of the internal components, including printed circuit boards for electronic assemblies, sensor arrays, antennas, and connectors, as well as providing a mechanical attachment point for internal components.

The drive system 301 includes motors 322, 324 and wheels 318, 320. The motors 322 and 324 connect to the wheels 318 and 320, respectively, each through an associated shaft, axle, and gear drive (not shown). The perimeter of wheels 318 and 320 can be two points where the interior mechanism can be in mechanical contact with inner surface 304. The points where wheels 318 and 320 contact inner surface 304 are an essential part of the drive mechanism of the ball, and so are preferably coated with a material to increase friction and reduce slippage. For example, the wheels 318 and 320 can be covered with silicone rubber tires.

In some variations, a biasing mechanism is provided to actively force the wheels 318, 320 against the inner surface 304. In an example provided, the spring 312 and end 310 can comprise a biasing mechanism. More specifically, spring 312 and spring end 310 are positioned to contact inner surface 304 at a point diametrically opposed to wheels 318 and 320. Spring 312 and end 310 provide additional contact force to reduce slippage of the wheels 318 and 320, particularly in situations where the interior mechanism is not positioned with the wheels at the bottom and where gravity does not provide adequate force to prevent the drive wheels from slipping. The spring 312 is selected to provide a small force pushing wheels 318 and 320, and the spring end 310 evenly against inner surface 304.

The spring end 310 is designed to provide near-frictionless contact with inner surface 304. The spring end 310 comprises a rounded surface configured to mirror a low-friction contact region at all contact points with the inner surface 304. Additional means of providing near-frictionless contact may be provided. In another implementation, the rounded surface may include one or more bearings to further reduce friction at the contact point where end 310 moves along inner surface 304. The spring 312 and the spring end 310 are preferably made of a non-magnetic material to avoid interference with sensitive magnetic sensors.

Figure 3B:
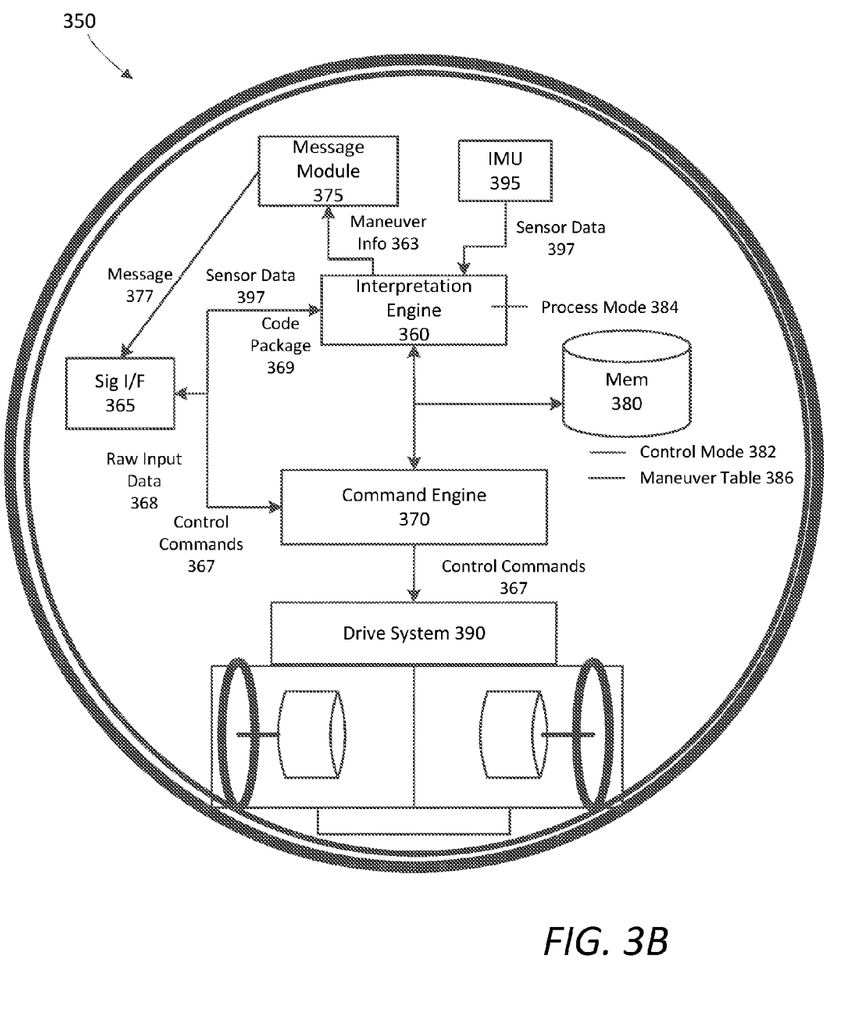
FIG. 3B is a block diagram illustrating an example self-propelled device upon which one or more example described herein may be implemented.

FIG. 3B is a block diagram illustrating an example self-propelled device upon which one or more example described herein may be implemented. For example, the self-propelled device 350 as depicted in FIG. 3B, may correspond to the self-propelled device 150 as depicted in FIG. 1. However, examples described herein are not limited to the self-propelled devices described herein. Accordingly, the disclosed processes may be implemented on any controllable device upon which processes may be outsourced. Referring to FIG. 3B, the self-propelled device 350 can include a signal interface 365 to receive information and data from a mobile computing device. The self-propelled device 350 may be under operational control of the mobile computing device in a control mode 382. In some examples, the self-propelled device 350, in control mode 382, can receive raw input data 368 from the mobile computing device, and transmit the raw input data 368 to a command engine 370, which may execute logic to translate the raw input data 368 into control commands 367 to be implemented on a drive system 390 of the self-propelled device 350 to cause the self-propelled device 350 to maneuver based on the raw input data 368. As provided herein, the raw input data 368 may be raw data directly associated with user interactions performed on a user interface of the mobile computing device.

Alternatively, the signal interface 365 can receive the control commands 367 directly from the mobile computing device, in which such raw input data 368 has already been translated by the mobile computing device. The control engine 370 can utilize the control commands 367 for implementation upon the drive system 390, thereby causing the self-propelled device 350 to maneuver accordingly. In control mode 382, the self-propelled device 350 can submit sensor data 397 from, for example, an inertial measurement unit 395, to the mobile computing device for processing. Such sensor data 397 may indicate the state of the self-propelled device, and/or maneuvers (e.g., tricks) performed by the self-propelled device.

In some examples, the self-propelled device 350 can include a latency monitor, and upon detection of latency in the connection between the self-propelled device 350 and the mobile computing device, the self-propelled device may automatically enter processing mode 384, as discussed below. In other examples, the mobile computing device detects latency in the connection and compiles a code package 369. The code package 369 can be received via, for example, the signal interface 365 of the self-propelled device 350, and transmitted to an interpretation engine 360. The interpretation engine 360 can decompress and/or execute the code package 369, which may cause the self-propelled device 350 to enter processing mode 384 in order to perform one or more processes outsourced from the mobile computing device.

In variations, the executed code package 369 can instruct the self-propelled device 350 to cease translation of raw input data 368 into control commands 367. In response, the mobile computing device can begin performing such translations and transmit control commands 367, which require less bandwidth to transmit.

Additionally or alternatively, the executed code package 369 can cause the self-propelled device 350 to cease transmission of sensor data 397 to the mobile computing device in order to consume less bandwidth. However, such sensor data 397 may contain valuable information for task-oriented operations of the self-propelled device 350 (e.g., experimentation or gameplay). Thus, the code package 369 may include instructions to be executed by the interpretation engine 360, causing the interpretation engine 360 to process the sensor data 397, as opposed to the mobile computing device. Thus, the interpretation engine 360 can perform calculations based on the sensor data 397 to determine, for example, maneuvers performed by the self-propelled device 350. As such, the self-propelled device 350 may include a memory 380 storing a maneuver table 386 (e.g., a look-up table) that correlates sensor data 397 to predefined maneuvers. Alternatively, the maneuver table 386 may be included in the code package 369 received from the mobile computing device.

The determined maneuvers can be compiled as maneuver information 363 and transmitted to a messaging module 375 of the self-propelled device 350. The messaging module 375 can create a message 377 to be transmitted to the mobile computing device which includes the maneuver information 363. Furthermore, the messaging module 375 can insert other information into the message 377, such as state information as described herein.

Thus, by performing operations otherwise performed by the mobile computing device (i.e., sensor data processing), and by outsourcing operations performed by the self-propelled device 350 (i.e., raw input data translation), latency in the connection between the mobile computing device and the self-propelled device 350 can be significantly reduced or eliminated. Further operations performed by the self-propelled device are discussed below with respect to FIGS. 4A-4B.

Figure 4A:
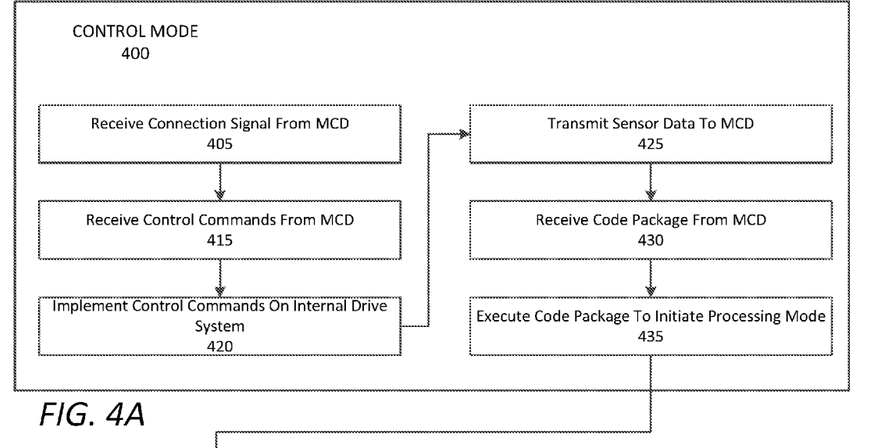
FIG. 4A is a flow chart describing example operations performed by a self-propelled device in control mode, in accordance with one or more examples described herein.
Figure 4B:
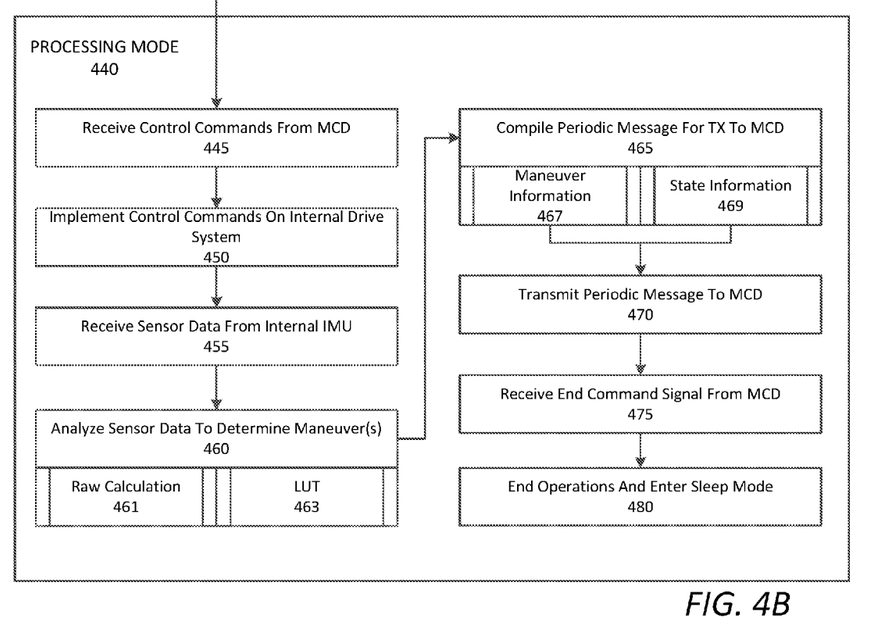
FIG. 4B is a flow chart describing example operations performed by a self-propelled device in processing mode, in accordance with one or more examples described herein.

FIGS. 4A-4B are flow charts describing example operations performed by a self-propelled device in control mode and a processing mode, in accordance with one or more examples described herein. In the below discussion of FIGS. 4A-4B, reference may be made to like reference characters representing various features of FIG. 3B for illustrative purposes. Furthermore, the methods described in connection with FIGS. 4A-4B may also be performed by the self-propelled device 350 as illustrated in FIG. 3B. Referring to FIG. 4A, the self-propelled device 350 can initially operate in a control mode (400) by receiving a connection signal from a mobile computing device (405). The connection signal can cause a connection (e.g., a BLUETOOTH low energy connection) to be established between the self-propelled device 350 and the mobile computing device.

Accordingly to many examples, the self-propelled device 350 may then receive control commands 367 from the mobile computing (415), and then implement the control commands 367 on the internal drive system 390 (420) thereby causing the self-propelled device 350 to maneuver based on user interactions with the mobile computing device. Additionally, the self-propelled device 350 may transmit sensor data 397 to the mobile computing device for processing (425), as discussed herein.

Based on a detected latency in the connection, the self-propelled device 350 may receive a code package 369 from the mobile computing device. The code package 369 can include instructions that ultimately cause the latency in the connection to be reduced or eliminated by limiting the data that is transmitted over the connection and/or prioritizing transmission of the control commands 367. Accordingly, the self-propelled device 350 can execute the code package 369 to initiate processing mode 384 (435).

Referring to FIG. 4B, upon execution of the code package 369, the self-propelled device 350 begin to perform operations in processing mode (400) that would otherwise be performed by the mobile computing device. Furthermore, the transition from control mode 382 to processing mode 384 may be instigated seamlessly so as to cause little or no disruption in the dynamic control of the self-propelled device 350 by the user. Thus, the self-propelled device 350 may continue to receive control commands 367 from the mobile computing device (445), and then implement the control commands 367 on the internal drive system 390, as provided herein (450).

In processing mode (400), the self-propelled device 350 can receive sensor data 397 from its own inertial measurement unit 395 (455). For example, the self-propelled device 350 can include an interpretation engine 360 that can analyze the sensor data 397 to dynamically determine maneuvers performed by the self-propelled device 350 (460). Such dynamic determinations may be made by performing calculations on raw sensor data 397 (461), or running such sensor data 397 through an algorithm, in order to produce solutions identifying maneuvers performed. Additionally or alternatively, the interpretation engine 360 can perform a look-up in a look-up table (463) that correlates sensor data 397, raw or processed, with predefined maneuvers.

In many examples, the self-propelled device 350 can compile a periodic message 377 to be transmitted to the mobile computing device (465). The periodic message 377 can include maneuver information 363 (467) and/or state information (469) describing the state of one or more components of the self-propelled device 350. Accordingly, the self-propelled device 350 can periodically compile such messages 377 and transmit them to the mobile computing device over the connection (470). When a control session (e.g., gameplay session) is ended, the self-propelled device 350 can receive an end command signal from the mobile computing device (475), and consequently end processing operations and power down various components to enter a sleep mode (480).

Hardware Diagram

Figure 5:
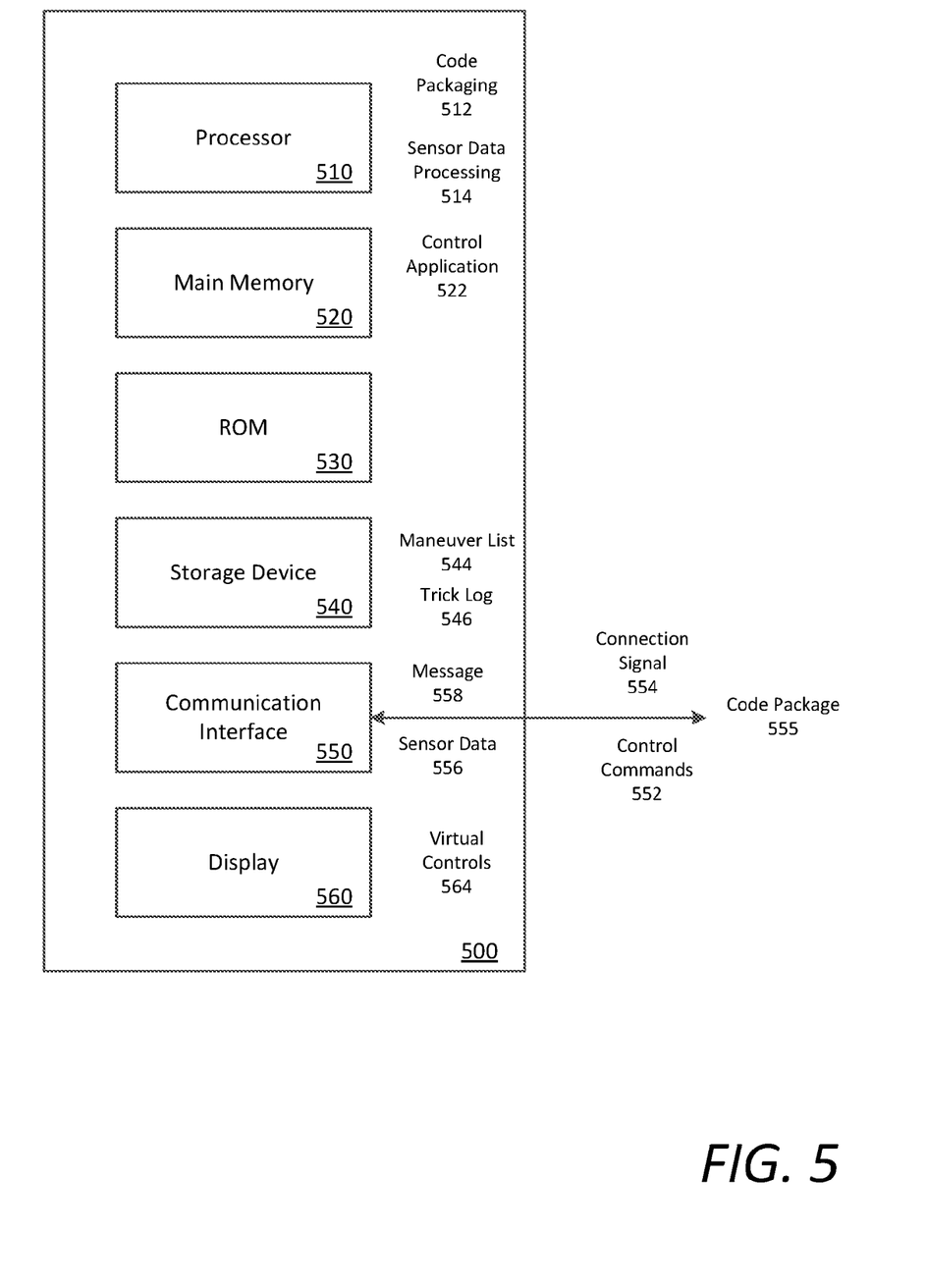
FIG. 5 is a block diagram that illustrates a computer system upon which examples described may be implemented.

FIG. 5 is a block diagram that illustrates a computer system upon which examples described may be implemented. For example, one or more components discussed with respect to the systems and the methods described herein may be performed by the system 500 of FIG. 5. The systems and methods described can also be implemented using a combination of multiple computer systems as described by FIG. 5.

In one implementation, the computer system 500 includes processing resources 510, a main memory 520, ROM 530, a storage device 540, a communication interface 550, and a display 560. The computer system 500 includes at least one processor 510 for processing information and a main memory 520, such as a random access memory (RAM) or other dynamic storage device, for storing information and instructions 522 to be executed by the processor 510. The main memory 520 also may be used for storing temporary variables or other intermediate information during execution of instructions to be executed by the processor 510. The computer system 500 may also include a read only memory (ROM) 530 or other static storage device for storing static information and instructions for the processor 510. A storage device 540, such as a magnetic disk or optical disk, is provided for storing information and instructions. For example, the storage device 540 can correspond to a computer-readable medium that store, for example, the maneuver list 544 and the trick log 546 for performing operations discussed with respect to FIGS. 1-4.

The communication interface 550 can enable computer system 500 to communicate with a self-propelled device (e.g., cellular or Wi-Fi network) through use of a network link (wireless or wire line). Using the network link, the computer system 500 can communicate with a plurality of devices, such as the self-propelled device 150. The main memory 520 of the computer system 500 can further store the control application 522 which can be launched by the processor 510. According to some examples, launch of the control application can cause a connection signal 554 to be transmitted to the self-propelled device. Furthermore, the computer system 500 can receive, via the communication interface 550, sensor data 556 from the self-propelled device. Accordingly, the processor 510 can perform sensor data processing 514 on the sensor data 556 in order to determine maneuvers performed by the self-propelled device. Additionally or as an alternative, the processor 510 can utilize a maneuver list 544 that correlates processed sensor data to maneuvers, and log such maneuvers in a trick log 546.

During operational control of the self-propelled device, the computer system 500 can detect latency in the connection, and in response to the latency exceeding a threshold, the processor can begin code packaging 512 in order to outsource processing to the self-propelled device. Thus, in addition to sending control commands 552, the computer system can send a code package 555 to the self-propelled device for execution. Execution of the code package 555 by the self-propelled device can cause the self-propelled device to perform sensor data processing 514, thereby eliminating the need to transmit sensor data 556 over the connection. However, in order to maintain and update the trick log 546, the self-propelled device can transmit a periodic message 558 that identifies maneuvers performed by the self-propelled device.

Examples described herein are related to the use of computer system 500 for implementing the techniques described herein. According to one example, those techniques are performed by computer system 500 in response to processor 510 executing one or more sequences of one or more instructions contained in main memory 520, such as the control application 522. Such instructions may be read into main memory 520 from another machine-readable medium, such as storage device 540. Execution of the sequences of instructions contained in main memory 520 causes processor 510 to perform the process steps described herein. In alternative implementations, hard-wired circuitry and/or hardware may be used in place of or in combination with software instructions to implement examples described herein. Thus, the examples described are not limited to any specific combination of hardware circuitry and software.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that this disclosure is not limited to those precise examples. As such, many modifications and variations will be apparent to practitioners skilled in this art. Accordingly, it is intended that the scope of this disclosure be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude the inventor from claiming rights to such combinations.

Although illustrative examples have been described in detail herein with reference to the accompanying drawings, variations to specific examples and details are encompassed by this disclosure. It is intended that the scope of the invention is defined by the following claims and their equivalents. Furthermore, it is contemplated that a particular feature described, either individually or as part of an example, can be combined with other individually described features, or parts of other examples. Thus, absence of describing combinations should not preclude the inventor(s) from claiming rights to such combinations.

While certain examples have been described above, it will be understood that the examples described are by way of example only. Accordingly, this disclosure should not be limited based on the described examples. Rather, the scope of the disclosure should only be limited in light of the claims that follow when taken in conjunction with the above description and accompanying drawings.

What is claimed is:

1. A self-propelled device comprising:
 a drive system operable to accelerate and maneuver the self-propelled device;
 at least one processor; and
 a memory storing instructions that, when executed by the at least one processor, cause the at least one processor to:
  establish a communication link with a controller device, the controller device being operable by a user to remotely control the self-propelled device;
  determine a signal latency in the communication link;
  receive, over the communication link, a computer code package from the controller device, wherein a content of the computer code package is based at least in part upon the determined signal latency; and
  execute the computer code package to perform one or more processing operations.

2. The self-propelled device of claim 1, wherein the signal latency is determined based on a detected signal latency in the communication link between the mobile computing device and the self-propelled device.

3. The self-propelled device of claim 1, wherein the signal latency is determined based on an anticipated signal latency in the communication link between the controller device and the self-propelled device.

4. The self-propelled device of claim 1, wherein the controller device comprises a mobile computing device executing a control application specific to remotely controlling the self-propelled device, and wherein the executed computer code package causes the at least one processor to establish the communication link based on the control application being initiated on the mobile computing device.

5. The self-propelled device of claim 1, wherein the executed instructions further cause the at least one processor to:
 receive, over the communication link, control commands from the controller device, the control commands being based on user inputs with the controller device; and
 implement the control commands on the drive system to accelerate and maneuver the self-propelled device.

6. The self-propelled device of claim 1, further comprising:
 an inertial measurement unit;
 wherein prior to execution of the computer code package, the executed computer code package causes the at least one processor to transmit sensor data from the inertial measurement to the controller device over the communication link.

7. The self-propelled device of claim 6, wherein execution of the computer code package causes the at least one processor to:
cease transmission of the sensor data over the communication link; and
determine, based on the sensor data from the inertial measurement unit, one or more maneuvers performed by the self-propelled device.

8. The self-propelled device of claim 7, wherein execution of the computer code package further causes the at least one processor to:
periodically transmit a message to the controller device over the communication link, the periodic message identifying the one or more maneuvers performed by the self-propelled device.

9. The self-propelled device of claim 7, wherein the communication link comprises a BLUETOOTH low energy link.

10. The self-propelled device of claim 7, wherein the signal latency causes a delay in control commands being transmitted from the controller device to the self-propelled device, the control commands being implemented by the at least one processor on the drive system to accelerate and maneuver the self-propelled device.

11. A computer implemented method of outsourcing processing, the method being performed by one or more processors of a self-propelled device and comprising:
establishing a communication link with a controller device, the controller device being operable by a user to remotely control the self-propelled device;
receiving, over the communication link, a computer code package from the controller device;
determining if a signal latency in the communication link exceeds a latency threshold;
ceasing a transmission of data from the self-propelled device to the controller device if the determined signal latency exceeds the relative latency threshold; and
executing the computer code package to perform one or more processing operations.

12. The method of claim 11, wherein determining if the signal latency exceeds the signal latency threshold comprises detecting signal latency in the communication link between the mobile computing device and the self-propelled device.

13. The method of claim 11, wherein determining if the signal latency exceeds the signal latency threshold comprises anticipating signal latency in the communication link between the controller device and the self-propelled device.

14. The method of claim 11, wherein the controller device comprises a mobile computing device executing a control application specific to remotely controlling the self-propelled device, and wherein establishing the communication link is based on the control application being initiated on the mobile computing device.

15. The method of claim 11, further comprising:
receiving, over the communication link from the controller device, control commands based at least in part on user inputs; and
implementing the control commands on a drive system of the self-propelled device to accelerate and maneuver the self-propelled device.

16. The method of claim 11, wherein the self-propelled device includes an inertial measurement unit, and wherein prior to execution of the computer code package, the one or more processors transmit sensor data from the inertial measurement to the controller device over the communication link.

17. The method of claim 16, further comprising:
based on executing the computer code package, determining, based on the sensor data from the inertial measurement unit, one or more maneuvers performed by the self-propelled device.

18. The method of claim 17, further comprising:
based on executing the computer code package, periodically transmitting a message to the controller device over the communication link, the periodic message identifying the one or more maneuvers performed by the self-propelled device.

19. The method of claim 17, wherein the communication link comprises a BLUETOOTH low energy link.

20. A non-transitory computer-readable medium storing instructions that, when executed by one or more processors of a self-propelled device, cause the self-propelled device to:
establish a communication link with a controller device, the controller device being operable by a user to remotely control the self-propelled device;
receive, over the communication link, a computer code package from the controller device;
determine if a signal latency in the communication link exceeds a latency threshold;
when the determined signal latency does not exceed the latency threshold, at least one of initiate and continue a transmission of data from the self-propelled device to the controller device; and
when the determined signal latency exceeds the latency threshold, execute the computer code package to perform one or more processing operations.

* * * * *